United States Patent
Park et al.

(10) Patent No.: US 8,836,756 B2
(45) Date of Patent: Sep. 16, 2014

(54) APPARATUS AND METHOD FOR ACQUIRING 3D DEPTH INFORMATION

(75) Inventors: Ji-Young Park, Daejeon (KR); Jae-Ho Lee, Daejeon (KR); Seung-Ki Hong, Daejeon (KR); Hee-Kwon Kim, Seoul (KR); Seung-Woo Nam, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 330 days.

(21) Appl. No.: 13/333,968

(22) Filed: Dec. 21, 2011

(65) Prior Publication Data

US 2012/0162385 A1 Jun. 28, 2012

(30) Foreign Application Priority Data

Dec. 22, 2010 (KR) .................. 10-2010-0132868

(51) Int. Cl.
*H04N 13/00* (2006.01)
(52) U.S. Cl.
USPC .......................................... 348/42
(58) Field of Classification Search
USPC ................ 348/42, 43, 46, 47, 48, 49, 50
See application file for complete search history.

(56) References Cited

U.S. PATENT DOCUMENTS

| | | | | |
|---|---|---|---|---|
| 7,136,090 | B1* | 11/2006 | McDuffie White | 348/14.16 |
| 2004/0264761 | A1* | 12/2004 | Mas et al. | 382/154 |
| 2005/0007487 | A1* | 1/2005 | Miyoshi et al. | 348/362 |
| 2005/0094854 | A1* | 5/2005 | Kim | 382/118 |
| 2005/0213182 | A1* | 9/2005 | Cossairt et al. | 359/244 |
| 2007/0098234 | A1* | 5/2007 | Fiala | 382/120 |
| 2008/0130015 | A1* | 6/2008 | Lu | 356/610 |
| 2010/0007717 | A1* | 1/2010 | Spektor et al. | 348/43 |
| 2011/0075920 | A1* | 3/2011 | Wu et al. | 382/160 |

FOREIGN PATENT DOCUMENTS

KR    1020050102609 A    10/2005

OTHER PUBLICATIONS

Daniel Scharstein et al., "High-Accuracy Stereo Depth Maps Using Structured Light", IEEE Computer Society Conference on Computer Vision and Pattern Recognition, 2003.

* cited by examiner

*Primary Examiner* — Tat Chio (57) ABSTRACT

Disclosed herein are an apparatus and method for acquiring 3D depth information. The apparatus includes a pattern projection unit, an image acquisition unit, and an operation unit. The pattern projection unit projects light, radiated by an infrared light source, into a space in a form of a pattern. The image acquisition unit acquires an image corresponding to the pattern using at least one camera. The operation unit extracts a pattern from the image, analyzes results of the extraction, and calculates information about a 3D distance between objects existing in the space.

14 Claims, 6 Drawing Sheets

APPARATUS AND METHOD FOR ACQUIRING 3D DEPTH INFORMATION

CROSS REFERENCE TO RELATED APPLICATION

This application claims the benefit of Korean Patent Application No. 10-2010-0132868, filed Dec. 22, 2010, which is hereby incorporated by reference in its entirety into this application.

BACKGROUND OF THE INVENTION

1. Technical Field

The present invention relates generally to an apparatus and method for acquiring three-dimensional (3D) depth information and, more particularly, to an apparatus and method for acquiring 3D depth information using an image in order to detect the movement of a user who is moving across a space.

2. Description of the Related Art

Optical methods are a widely used method for acquiring a depth image representative of a distance in a space.

An optical method includes a passive acquisition method using a plurality of cameras to provide two or more points of view and an active acquisition method of projecting light into a space and analyzing the projected light.

The passive acquisition method is widely known as stereo vision, and is a method in which two cameras are used just as human vision uses both eyes or is a method in which a three or more viewpoint camera system is used.

The passive acquisition method is disadvantageous in that it is difficult to measure the distance when it is difficult to find a feature point where a change in brightness value is present in a space where the distance is desired to be measured.

The active acquisition method is advantageous in that it is not significantly influenced by the illumination of a space or the presence or absence of a feature point and in that it is possible to accurately measure distances.

However, the active acquisition method generally uses visible light, in which case it is difficult to apply the active acquisition method to the case where a human is present due to a dazzling phenomenon. Furthermore, the active acquisition method is disadvantageous in that it is difficult to apply the active acquisition method to a situation where there is motion because a plurality of patterns is projected.

SUMMARY OF THE INVENTION

Accordingly, the present invention has been made keeping in mind the above problems occurring in the prior art, and an object of the present invention is to provide an apparatus and method for acquiring 3D depth information using an image in order to detect the movement of a user who is moving across a space.

In order to accomplish the above object, the present invention provides an apparatus for acquiring 3D depth information, including a pattern projection unit for projecting light, radiated by an infrared light source, into a space in a form of a pattern; an image acquisition unit for acquiring an image corresponding to the pattern using at least one camera; and an operation unit for extracting a pattern from the image, analyzing results of the extraction, and calculating information about a 3D distance between objects existing in the space.

The pattern projection unit may generate the pattern by representing a coded progression using primitives.

The pattern projection unit may include a conversion unit for converting the light, radiated by the infrared light source, into parallel light; a pattern mask unit for converting the parallel light into light including a pattern; and an adjustment unit for adjusting a focus of the light including the pattern so that the light including the pattern can be focused over a set distance.

The conversion unit may include a collimate lens.

The pattern mask unit may be configured by forming a coded pattern in a lens in compliance with predetermined rules.

The coding of the pattern may be performed by selecting code vectors having a longest Hamming distance from among a plurality of code vectors using a two-dimensional (2D) pseudo-random coding technique or a pseudo-random coding technique.

The adjustment unit may include a projection lens.

When the image acquisition unit has acquired the image using a single camera, the operation unit may calculate the 3D distance information using a triangulation method.

When the image acquisition unit has acquired the image using two cameras, the operation unit may calculate the 3D distance information by applying a triangulation method to left and right images acquired using the two cameras.

When the image acquisition unit has acquired the image using the two cameras, a relative location relationship between the pattern projection unit and the image acquisition unit may be acquired using calibration.

The operation unit may extract a pattern from the image using a feature extraction method based on the Harr wavelet.

The operation unit may set the results of the extraction as elements, and determine respective weights of the elements using the AdaBoost learning method.

Additionally, in order to accomplish the above object, the present invention provides a method of acquiring 3D depth information, including projecting light, radiated by an infrared light source, into a space in a form of a pattern; acquiring an image corresponding to the pattern using at least one camera; and extracting a pattern from the image, analyzing results of the extraction, and calculating information about a 3D distance between objects existing in the space.

The projecting may include converting the light, radiated by the infrared light source, into parallel light; converting the parallel light into light including a pattern; and adjusting a focus of the light including the pattern so that the light including the pattern can be focused over a set distance.

The converting the light into parallel light may be performed using a collimate lens.

The converting the parallel light into light may be performed using a lens in which a coded pattern is formed in compliance with predetermined rules.

The coding of the pattern may be performed by selecting code vectors having the longest Hamming distance from among a plurality of code vectors using a 2D pseudo-random coding technique or a pseudo-random coding technique.

The adjusting a focus of the light may be performed using a projection lens.

The calculating information about a 3D distance may be performed using a triangulation method.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Reference now should be made to the drawings, throughout which the same reference numerals are used to designate the same or similar components.

The present invention will be described in detail below with reference to the accompanying drawings. Repetitive descriptions and descriptions of known functions and constructions which have been deemed to make the gist of the present invention unnecessarily vague will be omitted below. The embodiments of the present invention are provided in order to fully describe the present invention to a person having ordinary skill in the art. Accordingly, the shapes, sizes, etc. of elements in the drawings may be exaggerated to make the description clear.

An apparatus and method for acquiring 3D depth information according to an embodiment of the present invention will be described in detail below with reference to the accompanying drawings.

First, the depth information according to this embodiment of the present invention is information corresponding to a depth image representative of the distance in a space.

Figure 1:
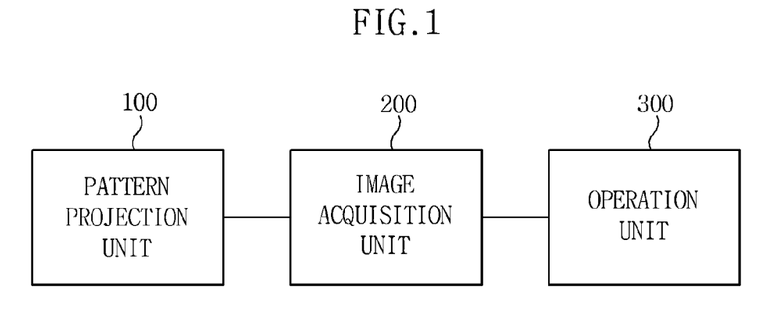
FIG. 1 is a diagram schematically illustrating the configuration of an apparatus for acquiring 3D depth information according to an embodiment of the present invention.

FIG. 1 is a diagram schematically illustrating the configuration of the apparatus for acquiring 3D depth information according to the embodiment of the present invention. Furthermore, FIG. 2 is a diagram illustrating the configuration of a pattern projection unit according to this embodiment of the present invention.

Referring to FIG. 1, the apparatus for acquiring 3D depth information includes a pattern projection unit 100, an image acquisition unit 200, and an operation unit 300.

The pattern projection unit 100 projects light, radiated by the infrared light source, into a space in the form of a pattern.

Figure 2:
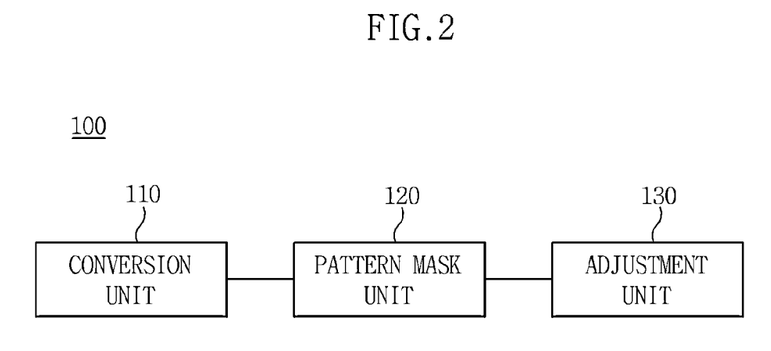
FIG. 2 is a diagram illustrating the configuration of a pattern projection unit according to this embodiment of the present invention.

Referring to FIG. 2, the pattern projection unit 100 includes a conversion unit 110, a pattern mask unit 120, and an adjustment unit 130.

The conversion unit 110 converts light, radiated by an infrared light source, into parallel light. Although the conversion unit 110 according to the embodiment of the present invention may be a collimate lens, the conversion unit 110 is not limited thereto.

The conversion unit 110 converts light, radiated by the infrared light source, into parallel light, thereby enabling the parallel light to perpendicularly enter the pattern mask unit 120.

Figure 3:
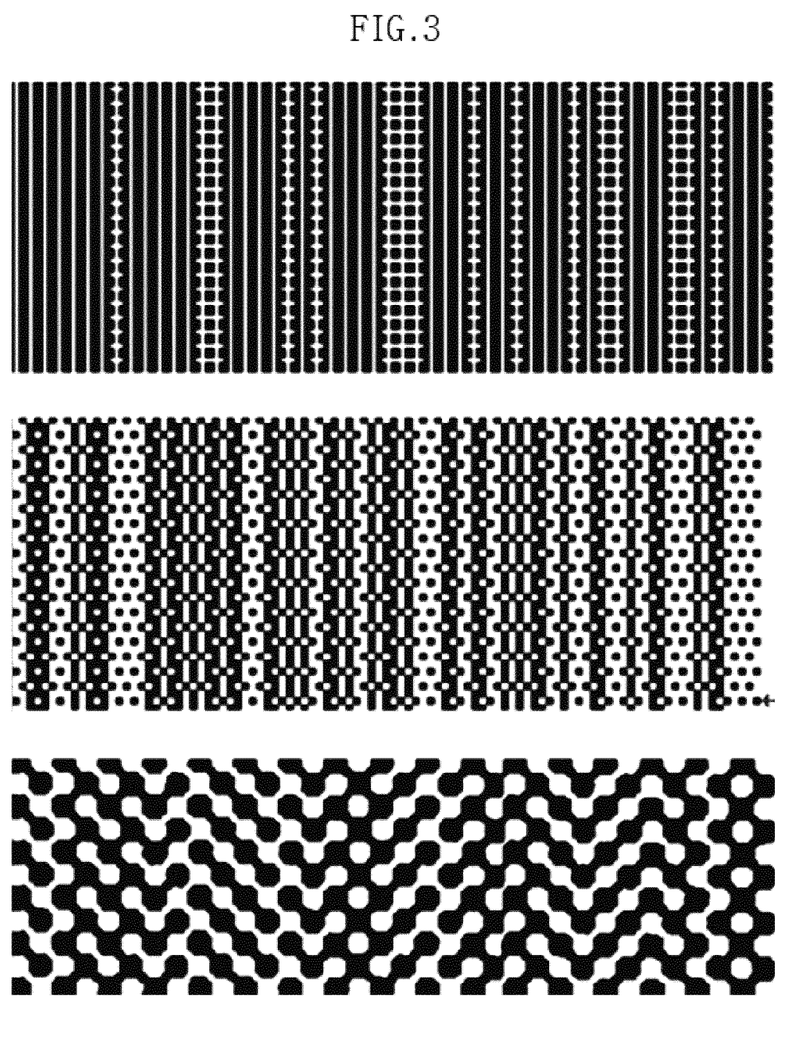
FIG. 3 is a diagram illustrating a coded pattern according to an embodiment of the present invention.
Figure 4:
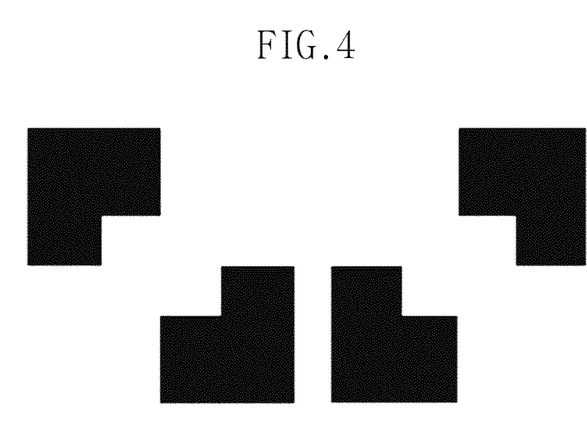
FIGS. 4 and 5 are diagrams illustrating primitives that constitute a pattern according to an embodiment of the present invention.
Figure 5:
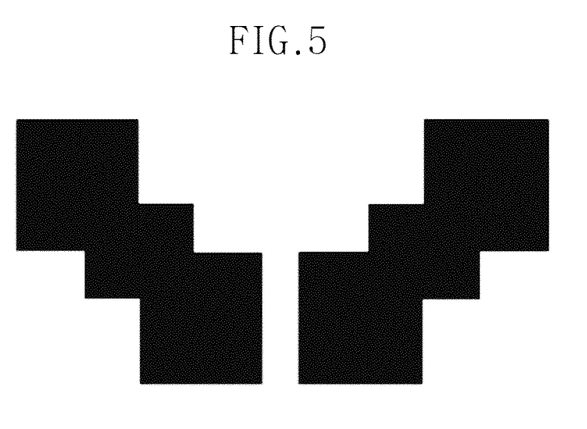

The pattern mask unit 120 converts parallel light into light including a specific pattern. The pattern mask unit 120 according to this embodiment of the present invention is configured to form a coded pattern in a lens in compliance with predetermined rules so that parallel light can exhibit a specific pattern, but the pattern mask unit 120 is not limited thereto. Here, the coding is performed to select code vectors having the longest Hamming distance from among a plurality of code vectors, and the coded pattern may be represented using a 2D pseudo-random coding technique or a pseudo-random coding technique in various forms, as shown in FIG. 3. FIGS. 4 and 5 show primitives that constitute the third pattern of FIG. 3. FIG. 4 shows a primitive representative of "1" in a binary pattern, and FIG. 5 shows a primitive representative of "0" in the binary pattern.

The pattern mask unit 120 according to this embodiment of the present invention generates a specific pattern by representing a coded progression with primitives, such as those shown in FIGS. 4 and 5, using a pseudo-random coding technique.

The adjustment unit 130 adjusts the focus of the light including the specific pattern so that the light including the specific pattern can be focused over a set distance. Although the adjustment unit 130 according to this embodiment of the present invention may be a projection lens, the adjustment unit 130 is not limited thereto.

The image acquisition unit 200 acquires an image corresponding to a pattern projected into a space. For this purpose, the image acquisition unit 200 includes one or two cameras (not shown).

Figure 6:
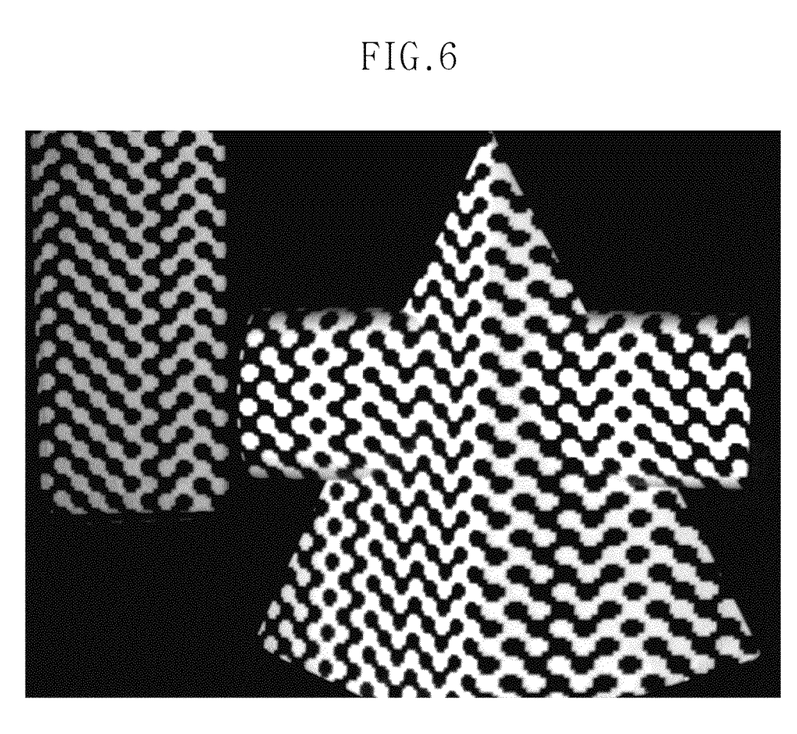
FIG. 6 is a diagram illustrating an example in which a pattern is projected into a space using a pattern projection unit according to an embodiment of the present invention and the space is captured using a camera.

The 3D distance information according to an embodiment of the present invention can be acquired using triangulation based on the pattern projected by the pattern projection unit 100 and a pattern extracted from images captured by the cameras, as shown in FIG. 6, but the present invention is not limited thereto. In this case, the method of performing triangulation varies depending on the number of cameras used.

The operation unit 300 extracts the pattern, projected by the pattern projection unit 100, from the image acquired by the image acquisition unit 200, analyzes the results of the extraction, and calculates the distance between objects existing in a space, that is, 3D distance information. In this case, the operation unit 300 utilizes a feature extraction method to extract the pattern projected by the pattern projection unit 100, that is, rectangular primitives, such as those shown in FIGS. 4 and 5. Here, the feature extraction method is a method of extracting the pattern, projected by the pattern projection unit 100, using the Harr wavelet.

Thereafter, the operation unit 300 determines the weights of respective elements using the extracted results as the elements based on the AdaBoost learning method. For this purpose, the operation unit 300 may include a primitive detector, but is not limited thereto.

Figure 7:
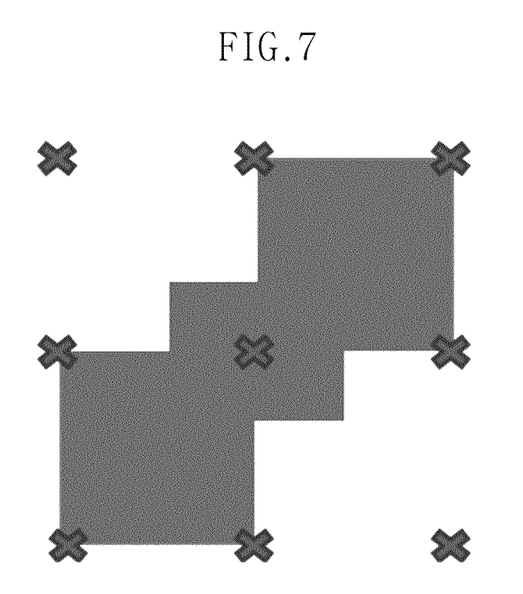
FIG. 7 is a diagram illustrating a coded progression according to an embodiment of the present invention.

Furthermore, the operation unit 300 acquires nine points from the detected nine primitives, as shown in FIG. 7, and finds a coded progression.

When a single camera is used, the locations of the pattern projection unit 100 and the image acquisition unit 200 are fixed. In this case, previous information includes the relative location relationship between the pattern projection unit 100 and the image acquisition unit 200 that is acquired using calibration. In this case, the operation unit 300 may estimate a distance value using triangulation based on the pattern projected by the pattern projection unit 100 and the pattern of the image acquired by the image acquisition unit 200.

When two cameras are used, the two cameras are spaced apart from each other by a specific interval, like the two eyes of a human. In this case, when the operation unit 300 finds the feature points of left/right images and utilizes a stereo matching technique, the operation unit 300 can estimate a distance value. However, when there is not enough texture information of a space in which it is desirable to find out a distance value, it is difficult to estimate a distance value because it is difficult to find the feature points of an image, which is the great limitation of the existing stereo matching technique.

The pattern projected by the pattern projection unit 100 according to this embodiment of the present invention may generate a feature point in a space. That is, since the image acquisition unit 200 can use a previously manufactured stereoscopic camera, it is easy to implement the image acquisition unit 200 and it may also be possible to acquire the distance in real time.

In contrast, when two cameras are used, the distance value can be estimated using triangulation based on the two cameras, rather than triangulation based on the pattern projection unit 100 and the camera. Here, the relative location relationship between the pattern projection unit 100 and the image acquisition unit 200 is acquired using calibration. In this case, an error may easily occur in the calibration that is performed to determine the location relationship between the pattern projection unit 100 and the camera.

However, the operation unit 300 according to an embodiment of the present invention may measure the distance by performing triangulation in conjunction with the projected pattern using the two cameras.

A method of acquiring 3D depth information will now be described in detail with reference to FIG. 8.

Figure 8:
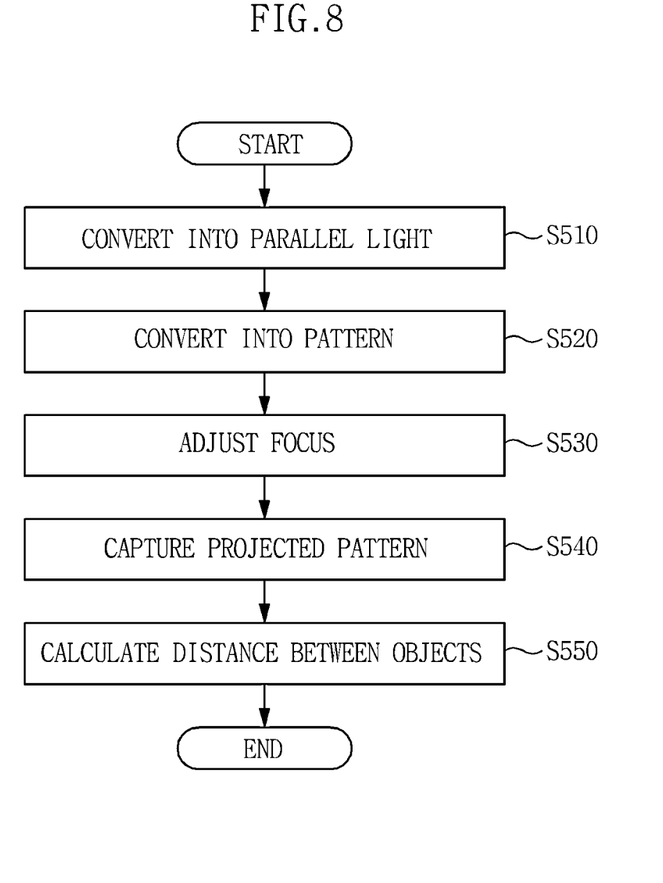
FIG. 8 is a flowchart illuminating a method of acquiring 3D depth information according to an embodiment of the present invention.

FIG. 8 is a flowchart illuminating the method of acquiring 3D depth information according to an embodiment of the present invention.

Referring to FIG. 8, the apparatus for acquiring 3D depth information converts light, radiated by an infrared light source, into parallel light at step S510. In this case, the apparatus for acquiring 3D depth information converts light, radiated by the infrared light source, into parallel light using a collimate lens.

The apparatus for acquiring 3D depth information converts the parallel light into light including a specific pattern at step S520.

The apparatus for acquiring 3D depth information adjusts the focus of the light including a specific pattern so that the light including the specific pattern is focused over a set distance at step S530. In this case, the apparatus for acquiring 3D depth information adjusts the focus of the light using a projection lens.

The apparatus for acquiring 3D depth information acquires an image corresponding to a pattern projected into a space at step S540.

The apparatus for acquiring 3D depth information extracts a specific pattern corresponding to the light, the focus of which has been adjusted, from the image corresponding to the pattern projected into a space, analyzes the results of the extraction, and then calculates the distance objects existing within the space, that is, 3D distance information at step S550.

The apparatus and method for acquiring 3D depth information according to the embodiments of the present invention have the advantage of rapidly acquiring a depth map representative of distance information in a space where a user freely moves using the infrared light source and a 2D pseudo-random coding technique or a pseudo-random coding technique, regardless of the presence of a feature point.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for acquiring three-dimensional (3D) depth information, the apparatus comprising:
   a pattern projection unit for projecting light, radiated by an infrared light source, into a space in a form of a pattern, the pattern projection unit including:
      a conversion unit for converting the light, radiated by the infrared light source, into parallel light;
      a pattern mask unit for converting the parallel light into the pattern, the pattern being a coded progression of primitives; and
      an adjustment unit for adjusting a focus of the pattern of light to focus the pattern over a set distance;
   an image acquisition unit for acquiring an image corresponding to the pattern using at least one camera; and
   an operation unit for extracting a pattern from the image, analyzing results of the extraction, and calculating information about a 3D distance between objects existing in the space.

2. The apparatus as set forth in claim 1, wherein the conversion unit comprises a collimate lens.

3. The apparatus as set forth claim 1, wherein the coding of the pattern is performed by selecting code vectors having a longest Hamming distance from among a plurality of code vectors using a two-dimensional (2D) pseudo-random coding technique or a pseudo-random coding technique.

4. The apparatus as set forth in claim 1, wherein the adjustment unit comprises a projection lens.

5. The apparatus as set forth in claim 1, wherein the operation unit, when the image acquisition unit has acquired the image using a single camera, calculates the 3D distance information using a triangulation method.

6. The apparatus as set forth in claim 1, wherein the operation unit, when the image acquisition unit has acquired the image using two cameras, calculates the 3D distance information by applying a triangulation method to left and right images acquired using the two cameras.

7. The apparatus as set forth in claim 6, wherein when the image acquisition unit has acquired the image using the two cameras, a relative location relationship between the pattern projection unit and the image acquisition unit is acquired using calibration.

8. The apparatus as set forth in claim 1, wherein the operation unit extracts a pattern of rectangular primitives from the image using a feature extraction method using Harr wavelets.

9. The apparatus as set forth in claim 1, wherein the operation unit sets results of the extraction as elements and determines respective weights of the elements using an AdaBoost learning method.

10. A method of acquiring 3D depth information, the method comprising:
   projecting light, radiated by an infrared light source, into a space in a form of a pattern, by:
      converting the light, radiated by the infrared light source, into parallel light;
      converting the parallel light into light including the pattern, the pattern being a coded progression of primitives; and
      adjusting a focus of the light including the pattern so that the light including the pattern can be focused over a set distance;
   acquiring an image corresponding to the pattern using at least one camera;
   extracting a pattern from the image;

analyzing results of the extraction; and calculating information about a 3D distance between objects existing in the space.

11. The method as set forth in claim 10, wherein the converting the light into parallel light is performed using a collimate lens.

12. The method as set forth in claim 10, wherein the coding of the pattern is performed by selecting code vectors having a longest Hamming distance from among a plurality of code vectors using a 2D pseudo-random coding technique or a pseudo-random coding technique.

13. The method as set forth in claim 10, wherein the adjusting a focus of the light is performed using a projection lens.

14. The method as set forth in claim 10, wherein the calculating information about a 3D distance is performed using a triangulation method.

* * * * *